United States Patent
Appenzeller

(10) Patent No.: US 9,001,827 B2
(45) Date of Patent: Apr. 7, 2015

(54) METHODS FOR CONFIGURING NETWORK SWITCHES

(75) Inventor: Guido Appenzeller, Menlo Park, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 331 days.

(21) Appl. No.: 12/971,924

(22) Filed: Dec. 17, 2010

(65) Prior Publication Data

US 2012/0155467 A1   Jun. 21, 2012

(51) Int. Cl.

| | |
|---|---|
| *H04L 12/28* | (2006.01) |
| *H04L 12/775* | (2013.01) |
| *H04L 12/741* | (2013.01) |
| *H04L 12/771* | (2013.01) |
| *H04L 12/937* | (2013.01) |
| *H04L 12/935* | (2013.01) |
| *H04L 12/931* | (2013.01) |
| *H04L 12/24* | (2006.01) |

(52) U.S. Cl.
CPC ........... *H04L 45/583* (2013.01); *H04L 41/0823* (2013.01); *H04L 41/12* (2013.01); *H04L 45/54* (2013.01); *H04L 45/56* (2013.01); *H04L 49/254* (2013.01); *H04L 49/3009* (2013.01); *H04L 49/70* (2013.01)

(58) Field of Classification Search
CPC ...................................................... H04L 12/56
USPC .......................... 370/338, 389, 392, 401, 466
See application file for complete search history.

(56) References Cited

U.S. PATENT DOCUMENTS

| | | | | |
|---|---|---|---|---|
| 7,349,981 | B2 * | 3/2008 | Guerrero ........................ | 709/238 |
| 7,729,291 | B2 * | 6/2010 | Heino et al. ................... | 370/254 |
| 8,089,962 | B2 * | 1/2012 | Lin ................................. | 370/389 |
| 8,116,312 | B2 * | 2/2012 | Riddoch et al. ............... | 370/389 |
| 2002/0061018 | A1 | 5/2002 | Chien | |
| 2004/0170173 | A1 * | 9/2004 | Pan et al. ....................... | 370/392 |
| 2005/0157749 | A1 | 7/2005 | Lee et al. | |

(Continued)

OTHER PUBLICATIONS

Pfaff et al., OpenFlow Switch Specification, Dec. 31, 2009, 42 pages.

(Continued)

*Primary Examiner* — Dang Ton
*Assistant Examiner* — Nourali Mansoury
(74) *Attorney, Agent, or Firm* — Treyz Law Group; G. Victor Treyz; Michael H. Lyons

(57) ABSTRACT

Network switches may be configured using flow tables. Flow table entries may contain header fields and associated actions. When a packet is received by a network switch, the network switch can compare fields in the packet to fields in the flow table entries and can take corresponding actions when matches are detected. A controller server can determine the topology of a network and can gather information on the capacities of network switches and other network switch capabilities. Based on this information and network configuration rules, the controller server can generate flow tables for the network switches that direct the switches to forward packets along desired paths through the network. The flow table entries for switches that are nearer the network core can be provided with more wildcarding than switches nearer the network edge. Traffic can be forwarded through encapsulation and deencapsulation engines to allow tunneling between isolated network domains.

13 Claims, 25 Drawing Sheets

(56) References Cited

U.S. PATENT DOCUMENTS

2008/0189769 A1    8/2008  Casado et al.
2010/0128743 A1*   5/2010  Nagano ................. 370/475

OTHER PUBLICATIONS

McKeown et al., OpenFlow: Enabling Innovation in Campus Networks, Mar. 14, 2008, 6 pages.

Cisco Systems, Cisco Catalyst 6500 Architecture, 1992-2007, 28 pages.

Casado et al., "SANE: A Protection Architecture for Enterprise Networks," Usenix Security, Aug. 2006 (15 pages).

Casado et al., "Ethane: Taking Control of the Enterprise," Conference of Special Interest Group on Data Communication (SIGCOMM), Japan, Aug. 2007 (12 pages).

Koponen et al., "Onix: A Distributed Control Platform for Large-scale Production Networks," Usenix Security, Oct. 2010 (14 pages).

Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/technicalreports/openflow-tr-2009-1-flowvisor.pdf.

Chiba et al., "A Proposal of Flow Entry Reduction Scheme for Flow-based Networks and Its Implementation on Open Flow-based Network", Technical Report of IEICE (The Institute of Electronics, Information and Communication Engineers), Japan, IEICE, NS, vol. 109, No. 448, pp. 7-12, Feb. 25, 2010.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 7B

| ... | DESTINATION IP ADDRESS | ... | ACTION |
|---|---|---|---|
| ... | 172.12.3.4 | ... | SEND TO PORT 3 |

FIG. 7C

| ... | DESTINATION IP ADDRESS | ... | ACTION |
|---|---|---|---|
| ... | 172.12.3.4 | ... | SEND TO PORT 5 |

FIG. 7D

| PHYSICAL IN PORT | IP SOURCE ADDRESS | IP DESTINATION ADDRESS | DESTINATION TCP PORT | SOURCE TCP PORT | ACTION |
|---|---|---|---|---|---|
| 1 | 1.1.1.1 | 2.2.2.2 | 22 | 7777 | SEND TO PORT 2 |
| ... | | | | | |
| 3 | 1.1.1.1 | 2.2.2.2 | 22 | 7777 | SEND TO PORT 4 |
| ... | | | | | |
| 5 | 1.1.1.1 | 2.2.2.2 | 22 | 7777 | SEND TO PORT 6 |

E1 → row 1; C1 → row 3; E2 → row 5

(PRIOR ART)
FIG. 13

| PHYSICAL IN PORT | IP SOURCE ADDRESS | IP DESTINATION ADDRESS | DESTINATION TCP PORT | SOURCE TCP PORT | ACTION |
|---|---|---|---|---|---|
| * | * | 2.2.2.2 | * | * | SEND TO PORT 2 |
| ... | | | | | |
| * | * | 2.2.2.2 | * | * | SEND TO PORT 4 |
| ... | | | | | |
| * | * | 2.2.2.2 | * | * | SEND TO PORT 6 |

| PHYSICAL IN PORT | IP SOURCE ADDRESS | IP DESTINATION ADDRESS | DESTINATION TCP PORT | SOURCE TCP PORT | ACTION |
|---|---|---|---|---|---|
| 1 | 1.1.1.1 | 2.2.2.2 | 22 | 7777 | SEND TO PORT 2 |
| ... | | | | | |
| * | * | 2.2.2.2 | * | * | SEND TO PORT 4 |
| ... | | | | | |
| 5 | 1.1.1.1 | 2.2.2.2 | 22 | 7777 | SEND TO PORT 6 |

E1' ↗ (row 1), C1' ↗ (row 3), E2' ↗ (row 5)

FIG. 15

| PHYSICAL IN PORT | IP SOURCE ADDRESS | IP DESTINATION ADDRESS | DESTINATION TCP PORT | SOURCE TCP PORT | ACTION |
|---|---|---|---|---|---|
| 1 | 1.1.1.1 | 2.2.2.2 | * | * | SEND TO PORT 2 |
| ... | | | | | |
| * | * | 2.2.2.2 | * | * | SEND TO PORT 4 |
| ... | | | | | |
| 5 | * | 2.2.2.2 | 22 | * | SEND TO PORT 6 |
| | | | | | |

E1″ ↗ (row 1)
C1″ ↗ (row 3)
E2″ ↗ (row 5)

FIG. 16

| PHYSICAL IN PORT | IP SOURCE ADDRESS | IP DESTINATION ADDRESS | DESTINATION TCP PORT | SOURCE TCP PORT | ACTION |
|---|---|---|---|---|---|
| 1 | 1.1.1.1 | 3.3.3.3 | 22 | 7777 | SEND TO PORT 2 |
| ... | | | | | |
| * | * | 3.* | * | * | SEND TO PORT 7 |
| ... | | | | | |

E3 ↗ (row 1)
C2 ↗ (row 3)

FIG. 20

EDGE

| PORT 4 | ADDRESS (E.G., SOURCE IP ADDRESS, ETHERNET SOURCE ADDRESS VLAN TAG, COMBINATION OF ADDRESSES WITH OTHER FIELDS SUCH AS ETHERNET ADDRESS AND VLAN TAG, ETC.) | CORRESPONDING ACTION |
|---|---|---|
| | | |

NON-EDGE

| PORT= * | ADDRESS | CORRESPONDING ACTION |
|---|---|---|
| | | |

FIG. 23

METHODS FOR CONFIGURING NETWORK SWITCHES

BACKGROUND

This relates to communications networks, and more particularly, to configuring switches in communications networks.

Packet-based networks such as the internet and local data networks that are connected to the internet include network switches. Network switches are used in forwarding packets from packet sources to packet destinations.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Each network switch on which a controller client has been implemented may include a flow table with entries that specify how packets are to be forwarded by that switch. If care is not taken, the number of flow table entries that are required to implement this type of arrangement may exceed the capabilities of some of the switches in a network. Challenges may also arise in conveying traffic between isolated network domains that are based on cross-platform network switches of this type.

It would therefore be desirable to be able to provide improved arrangements for operating network switches.

SUMMARY

Network switches may be configured using flow tables. Flow table entries may contain header fields and associated actions. When a packet is received by a network switch, the network switch can compare fields in the packet to fields in the flow table entries. The network switch can take appropriate actions when matches are detected. For example, the network switch can forward packets to an appropriate switch port.

A controller server can be used to control the network switches. Each of the network switches may contain a controller client. The controller server and the controller clients may use network protocol stacks to communicate over network connections. For example, the controller server can distribute flow table entries to the controller clients that direct the network switches to perform desired packet processing operations.

The controller server can determine the topology of a network and can gather information on the capacities of network switches and other network switch capabilities. Based on this information, the controller server can generate flow tables for the network switches that direct the switches to forward packets along desired paths through the network. The flow table entries for switches that are nearer the network core can be provided with more wildcarding than switches nearer the network edge, to avoid overwhelming the capacities of the switches near the network core. Packet forwarding functionality can be preserved in the presence of wildcarding by ensuring that the flow table entries for the switches at the network edge have less wildcarding than the switches nearer the network core.

In some networks, switches such as core switches may form a local core network that is not configured by the flow table entries that are generated by the controller server. The local core network may be interposed between domains in a network of switches that are configured using flow tables. The local core network may therefore isolate the network domains from each other.

In this type of network, traffic can be tunneled from one isolated domain to the other through the local core network. Traffic may be tunneled using an encapsulation engine in one domain that encapsulates packets and a corresponding deencapsulation engine in the other domain that deencapsulates packets. The network switches that are used in implementing the encapsulation and deencapsulation engines can be located on network switches at potentially arbitrary locations within the isolated network domains. The controller server can discover the locations of these switches and can generate flow table entries that direct the network switches to forward traffic along an appropriate path that includes the encapsulation and deencapsulation engines.

Further features of the invention, its nature and various advantages will be more apparent from the accompanying drawings and the following detailed description of the preferred embodiments.

BRIEF DESCRIPTION OF THE DRAWINGS

FIG. 7B is a diagram of an illustrative flow table of the type that may be used by a packet processing system showing three illustrative types of packet forwarding that may be performed based on the flow table entries of the flow table in accordance with an embodiment of the present invention.

FIG. 7C is a diagram of an illustrative flow table in which packets with a particular address are forwarded to the third physical port in a switch in accordance with an embodiment of the present invention.

FIG. 7D is a diagram of an illustrative flow table in which packets with a particular address are forwarded to the fourth physical port in a switch in accordance with an embodiment of the present invention.

FIG. 13 is a table of conventional flow table entries that may be used in forwarding packets along the path of FIG. 12.

FIG. 14 is another table of conventional flow table entries that may be used in forwarding packets along the path of FIG. 13.

FIG. 15 is an illustrative table of flow table entries that may be used in forwarding packets along the path of FIG. 12 in accordance with an embodiment of the present invention.

FIG. 16 is another illustrative table of flow table entries that may be used in forwarding packets along the path of FIG. 12 in accordance with an embodiment of the present invention.

FIG. 20 is a flow table containing illustrative entries that may be used in forwarding packets in a network of the type shown in FIG. 19 in accordance with an embodiment of the present invention.

FIG. 23 is a diagram of illustrative edge switch flow table entries and non-edge-switch flow table entries that may be used in a network in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment.

Network switches range in capability from relatively small Ethernet switches and wireless access points to large rack-based systems that include multiple line cards, redundant power supplies, and supervisor capabilities. Ethernet switches are sometimes used near the edge of a network and are therefore sometimes referred to as edge switches or top-of-rack switches. Larger rack-based systems are often used in network core locations and are sometimes referred to as routers, core routers, or core switches. In some network environments, network switches that lie between the core switches and the edge switches are referred to as aggregation switches or distribution switches. Aggregation switches and core switches may sometimes collectively be referred to as non-edge switches.

It is not uncommon for networks to include equipment from multiple vendors. As an example, a network for a university or corporate campus might include core switches from one vendor, edge switches from another vendor, and aggregation switches from yet another vendor. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
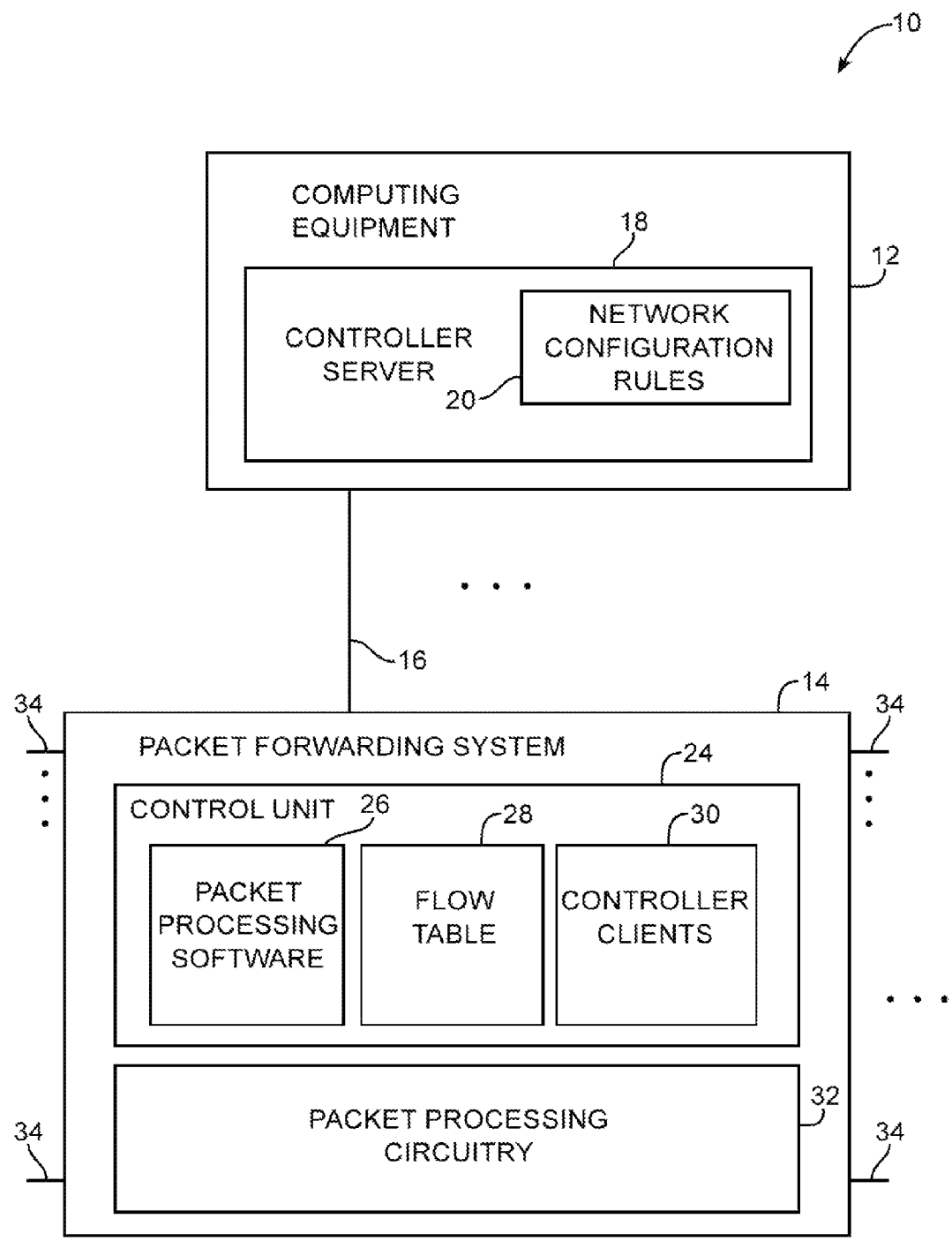
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Control server 18 may be implemented on a stand-alone computer, on a cluster of computers, on a set of computers that are distributed among multiple locations, on hardware that is embedded within a network switch, or on other suitable computing equipment 12. Controller server 10 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34. Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18, may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

Figure 2:
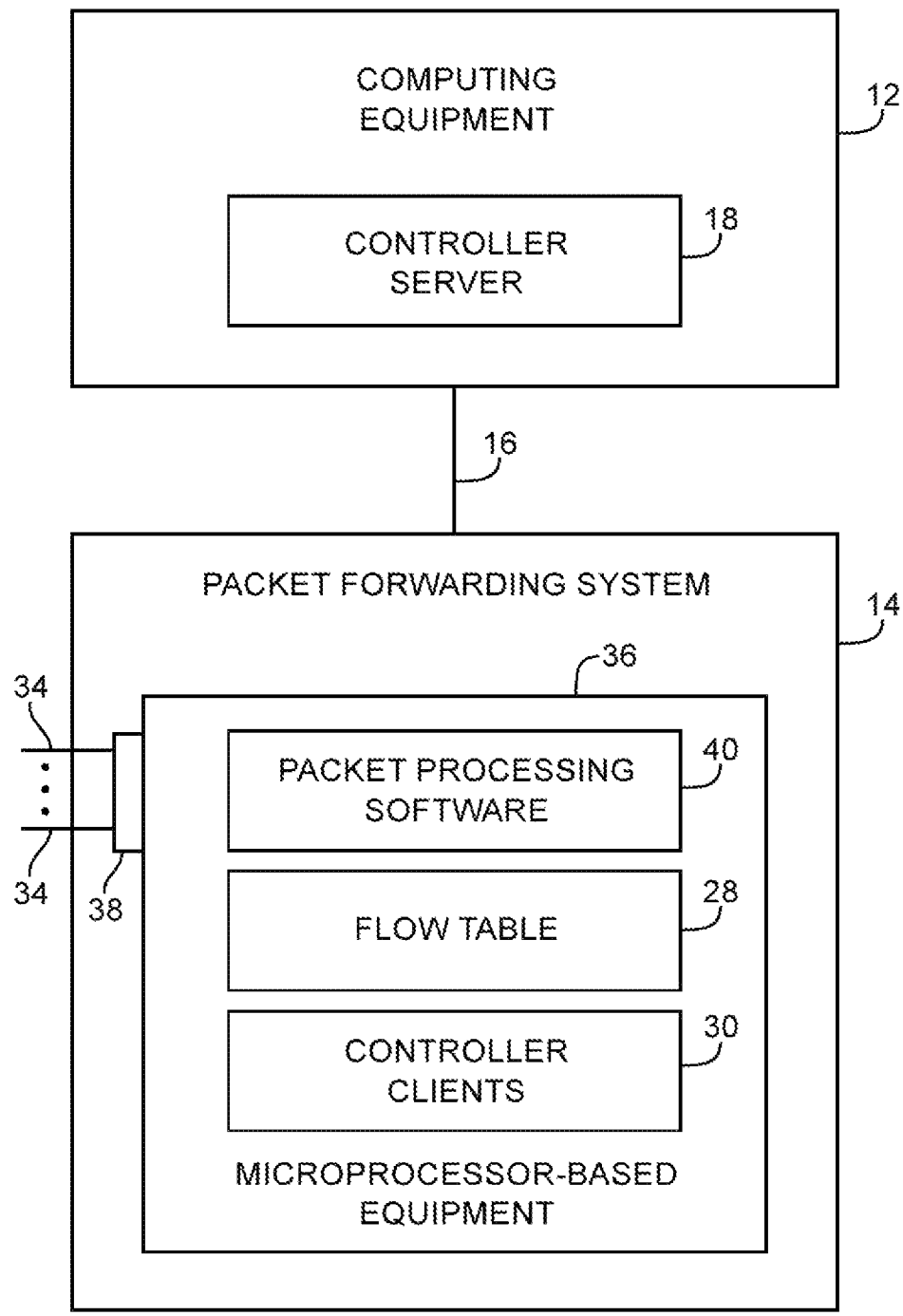
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
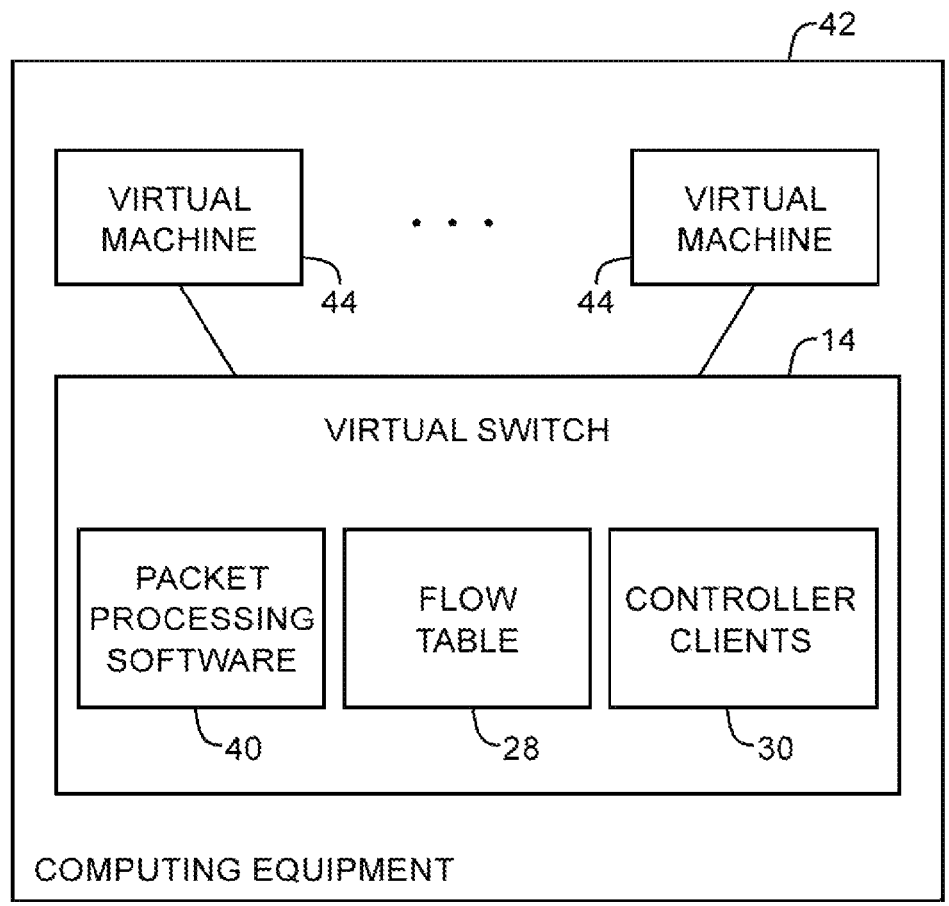
FIG. 3 is a diagram showing how a virtual switch may be used to perform the functions of a packet forwarding system in accordance with an embodiment of the present invention.

Another illustrative type of network switch is shown in FIG. 3. In the example of FIG. 3, computing equipment 42 is being used to implement virtual machines 44. Computing equipment 42 may be, for example, a server that is based on one or more computers and virtual machines 44 may be used to implement web servers or other online services. In a typical scenario, a customer who has purchased virtual machine services may be assigned a number of virtual machines 44. To ensure that these virtual machines can communicate with each other, some of the resources of computing equipment 42 are used to implement network switch 14 (e.g., a packet processing system based on software such as packet processing software 40, flow table 28, and controller clients 30). Switch 14, which may sometimes be referred to as a virtual switch, forms a type of packet forwarding system that can forward packets between respective virtual machines 44.

Figure 4:
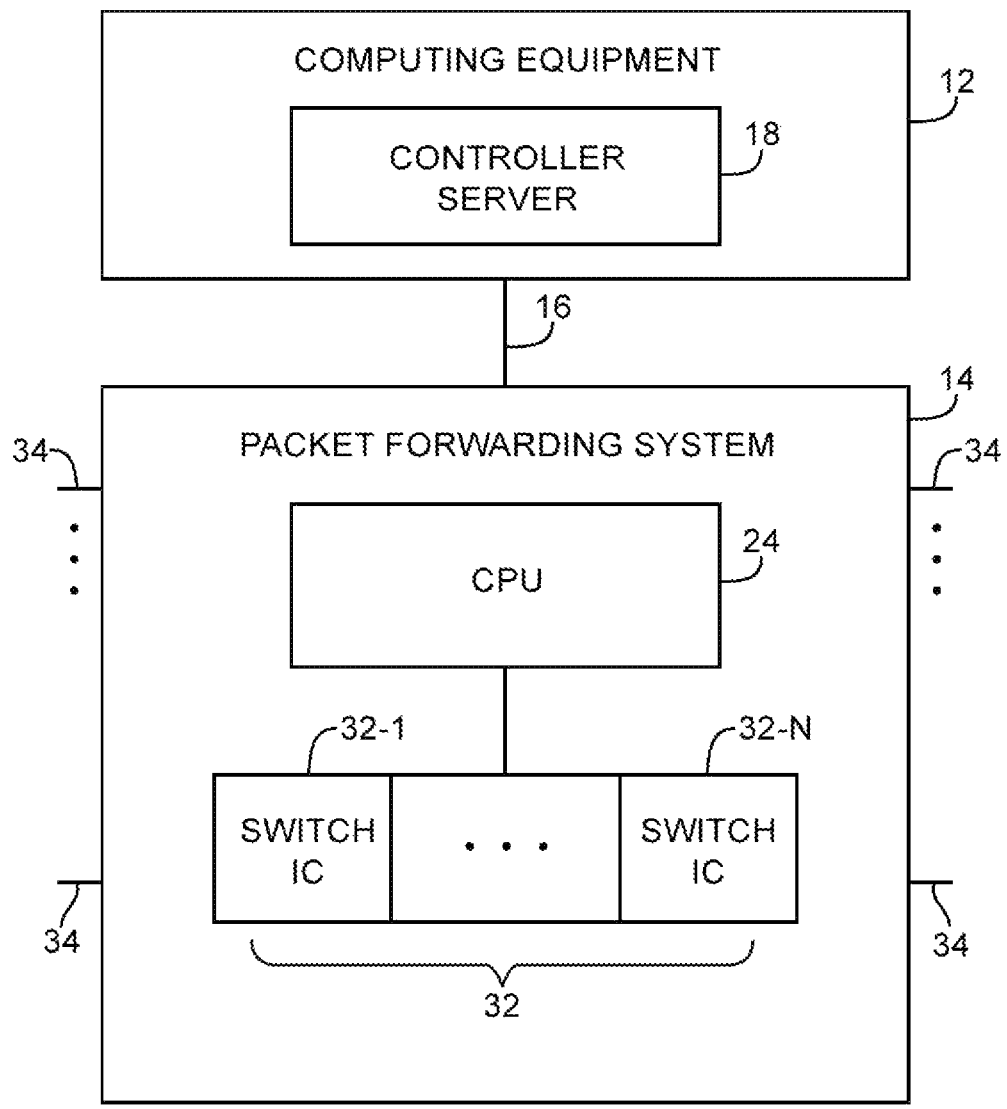
FIG. 4 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 4. As shown in FIG. 4, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 5:
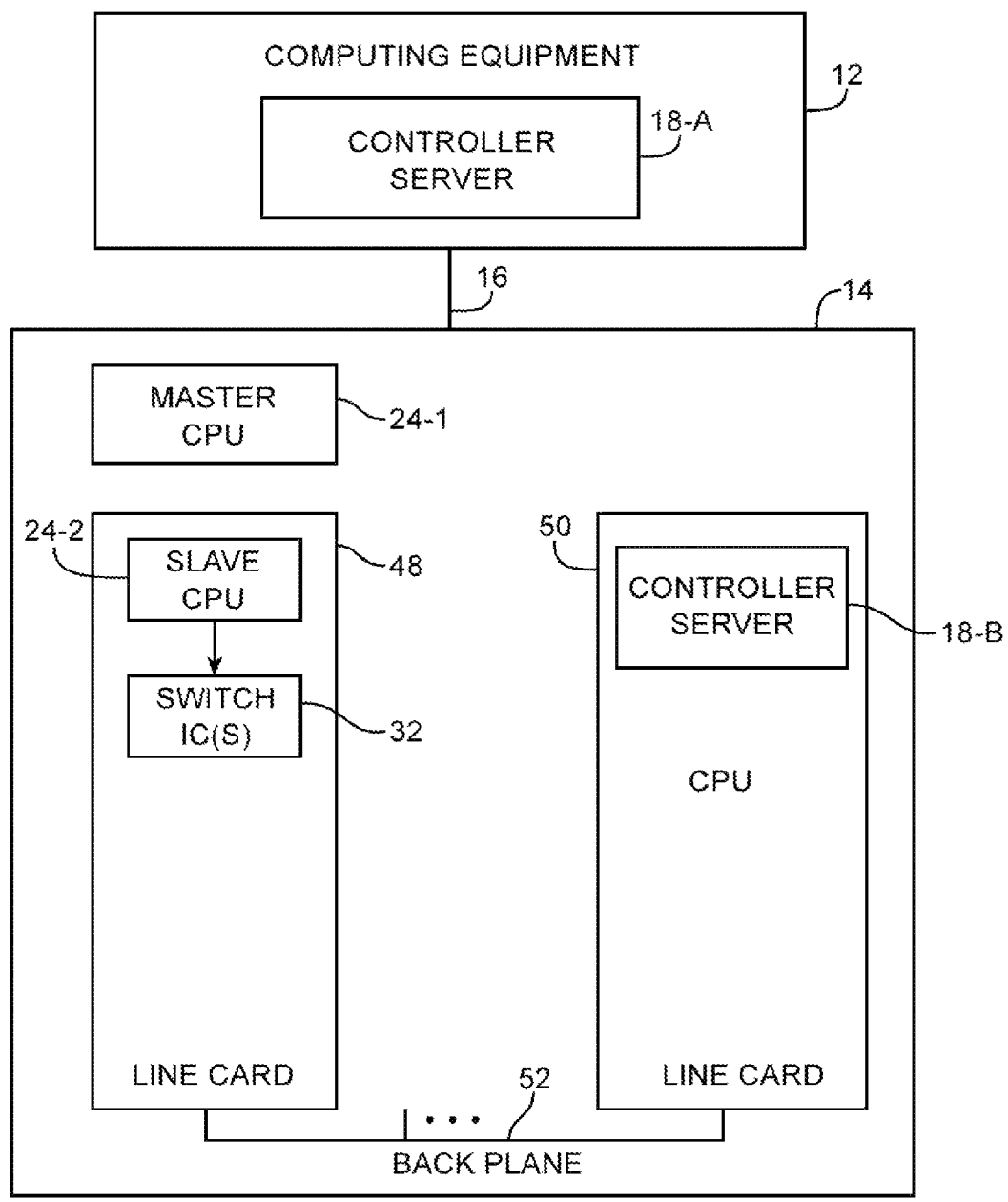
FIG. 5 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 5. In the FIG. 5 example, switch (packet forwarding system) 14 may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 5, the controller server may be implemented using the processing resources of a line card. For example, the controller server may be implemented on line card 50 as illustrated by controller server 18-B of FIG. 5. If desired, the controller server may be implemented on computing equipment 12 (e.g., as controller server 18-A of FIG. 5). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 6:
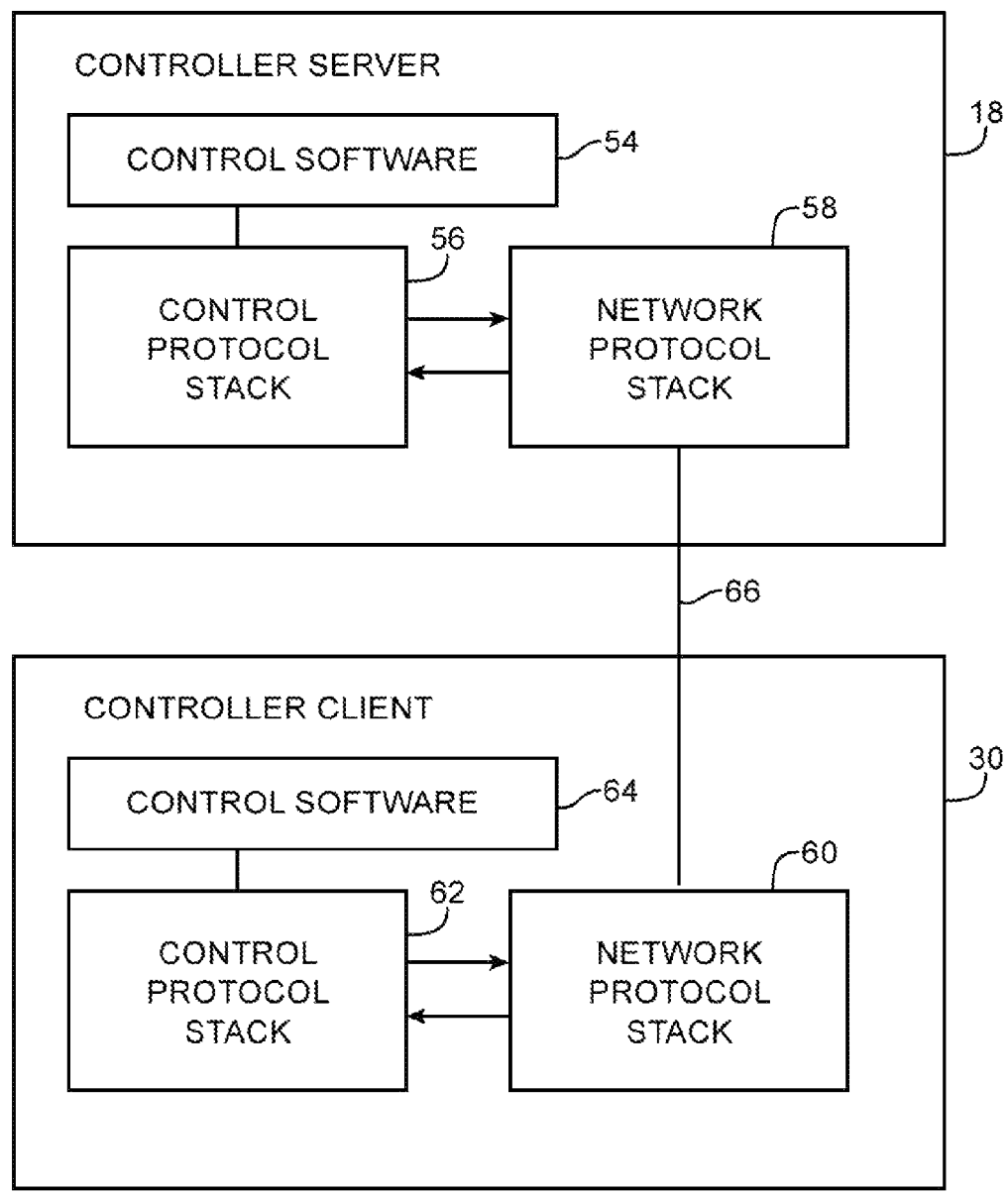
FIG. 6 is a diagram of a controller server and controller client that are communicating over a network connection in accordance with an embodiment of the present invention.

As shown in FIG. 6, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 5. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 6, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 7A:
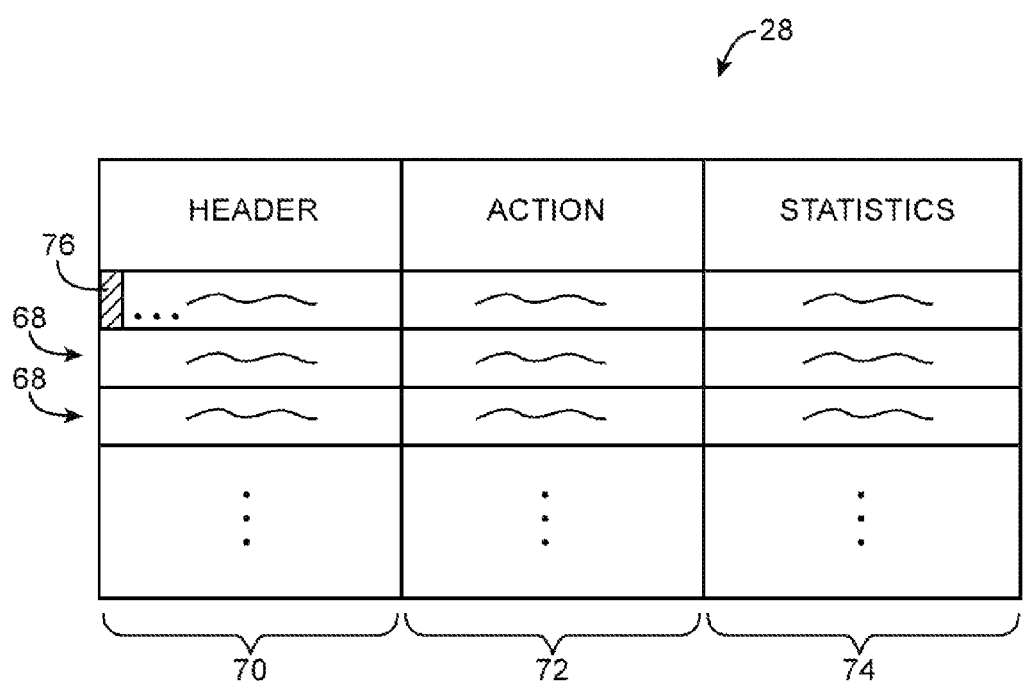
FIG. 7A is a diagram of an illustrative flow table of the type that may be used by a packet processing system in accordance with an embodiment of the present invention.

An illustrative flow table is shown in FIG. 7. As shown in FIG. 7A, table 28 may have flow table entries (row) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) id, VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum spanning tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify Ethernet source MAC (Media Access Control) address, Modify Ethernet destination MAC address, Modify IPv4 source address, Modify IPv4 ToS bits, Modify transport destination port.

FIG. 7B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 7B table directs the switch in which the flow table entry is operating to perform Ethernet switching. In particular, incoming packets with matching Ethernet destination addresses are forwarded to port 3.

The entry of the second row of table of FIG. 7B illustrates how a switch may be configured to perform internet routing (i.e., packets are forwarded based on their destination IP address).

The third row of the table of FIG. 7B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 7B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 7C and may provide the second switch with the flow table entry of FIG. 7D. When packets with destination IP address 172.12.3.4 are received at the first switch, they are forwarded to the second switch in accordance with the "forward to port 3" action in the FIG. 7C table. When these packets are received at the second switch, they are forwarded to the second end host that is connected to port 5 of the second switch in accordance with the "forward to port 5" action in FIG. 7D.

Figure 8:
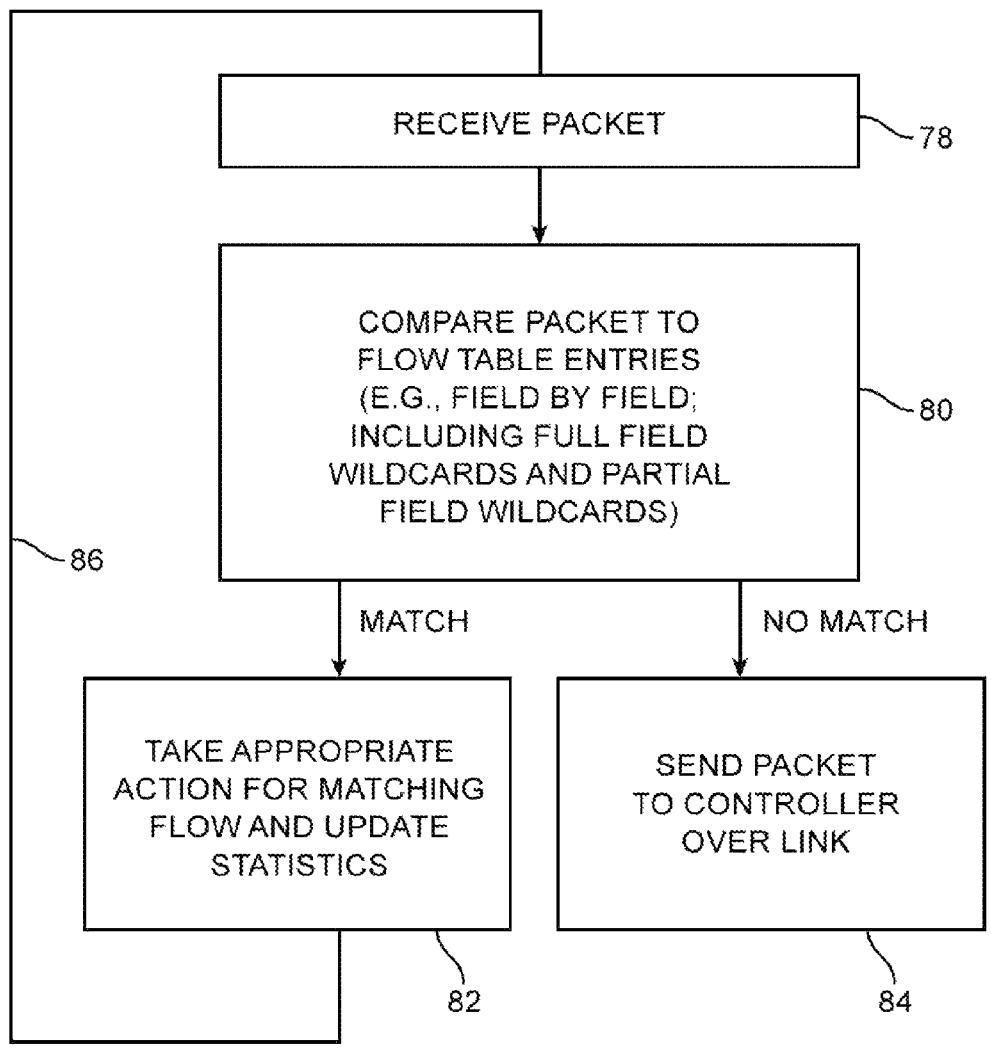
FIG. 8 is a flow chart of illustrative steps involved in processing packets in a packet processing system in accordance with an embodiment of the present invention.

Illustrative steps that may be performed by switch 14 in processing packets that are received on input-output ports 34 are shown in FIG. 8. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 9:
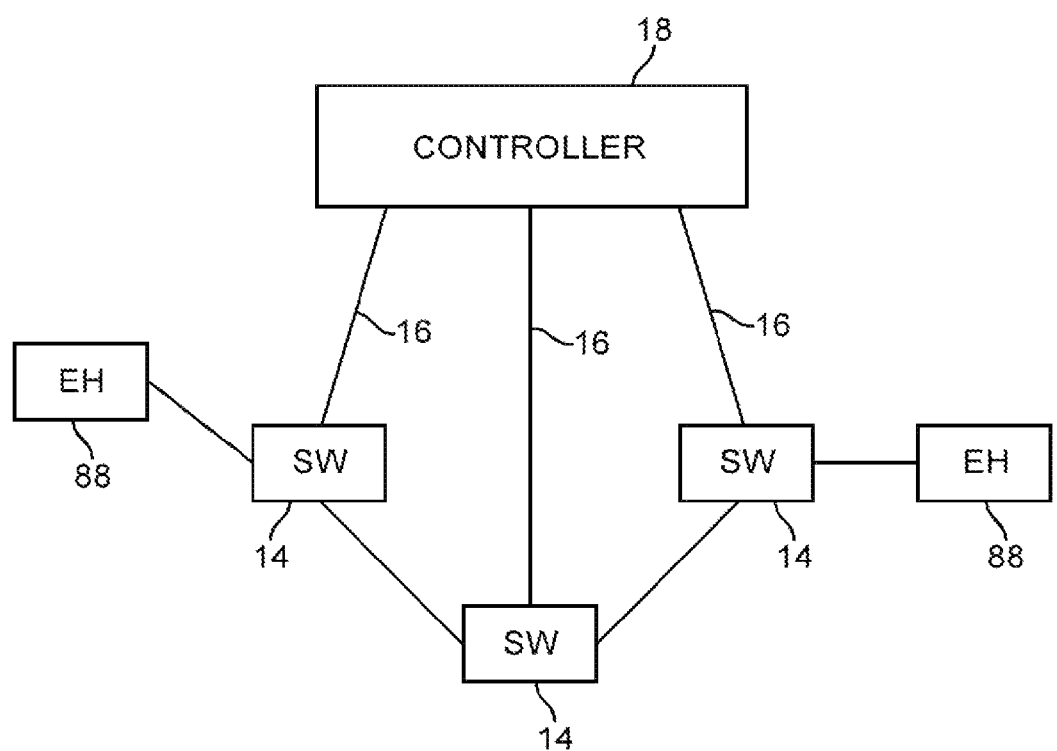
FIG. 9 is a diagram of a network showing how a controller can control multiple network switches in accordance with an embodiment of the present invention.

FIG. 9 is a diagram of an illustrative network showing how controller server 18 may control multiple switches 14 using multiple associated network connections 16. In the illustrative network shown in FIG. 9, a first end host (the end host 88 on the left side of FIG. 9) is communicating with a second end host (the end host 88 on the right side of FIG. 9). End hosts 88 may be computers (e.g., personal computers), servers, clusters of computers, set-top boxes, handheld devices, or any other computing equipment. During part of the communications between end hosts 88, the first end host may be serving as a packet source and the second end host may be serving as a packet destination. At other times, roles may be reversed, so that the second end host is serving as a packet source while the first end host is serving as a packet destination.

To ensure that packets are forwarded correctly through the network, controller 18 may provide each of the switches shown in FIG. 9 with appropriate flow table entries. With one suitable arrangement, controller server 18 may supply switches 14 with flow table entries in response to receipt of a packet that has been sent to controller server 18 from a switch that did not detect a match between an incoming packet and its flow table entries. When controller server 18 receives the packet, controller server 18 can use network configuration rules 20 (FIG. 1), information from the packet, network topology information, and other information in determining appropriate entries for flow tables 28 for switches 14. Controller server 18 may then provide the flow table entries to switches 14 to configure the switches for forwarding packets through the network. With another suitable arrangement, controller server 18 provides flow tables 28 to switches 28 during setup operations.

Regardless of whether controller server 18 provides switches 14 with flow table entries in advance or in real time in response to receipt of a packet from a switch, once each switch 14 has been provided with the flow table entries, the flow table entries will ensure that the switches 14 will forward the packets along a satisfactory path through the network.

Care should be taken so as not to overload the resources of switches 14. Each switch 14 generally has a limited flow table capacity. The capacity of a switch may, for example, limit that switch to handling no more than 10,000 flow table entries. To avoid exceeding this limit, switches at different network locations may be provided with flow table entries that implement rules with different levels of specificity.

Figure 10:
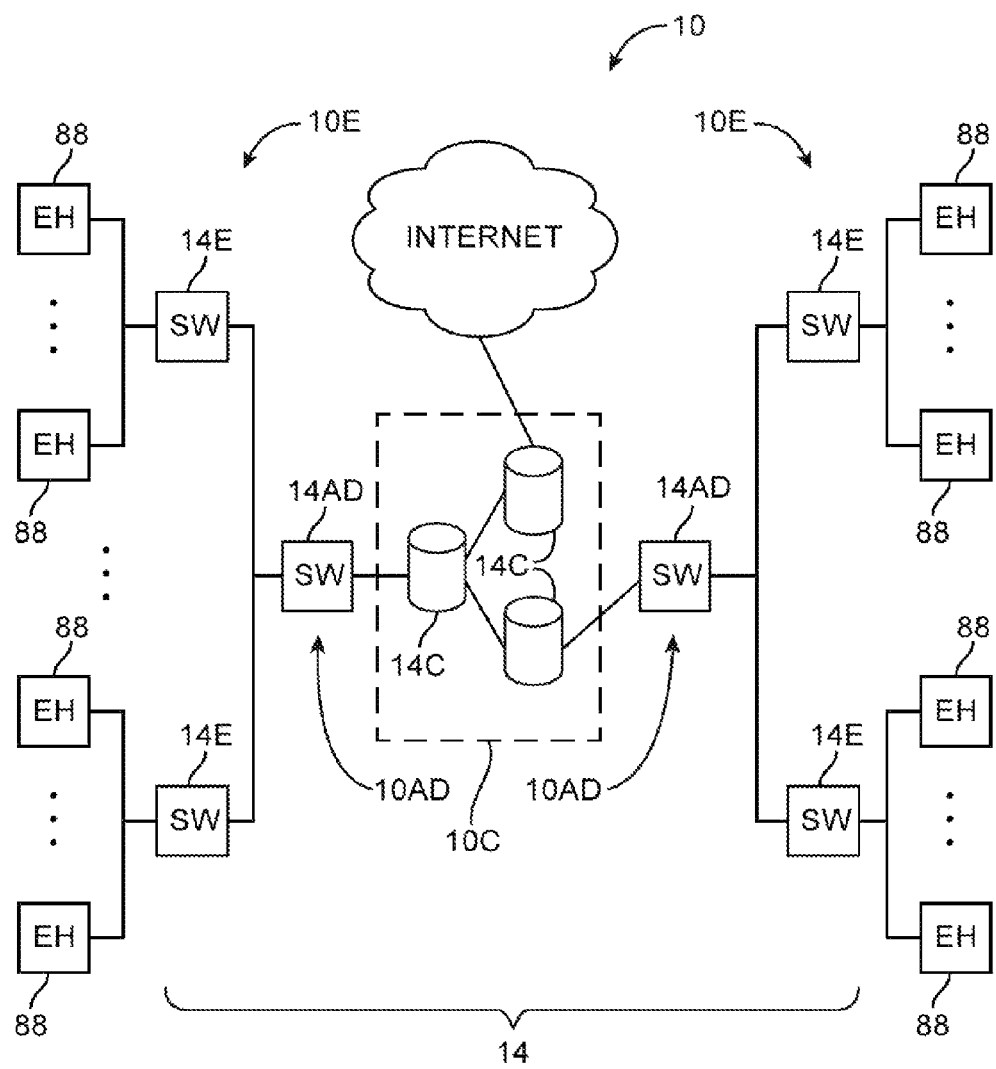
FIG. 10 is a diagram of an illustrative network showing how switches may be distributed through different portions of the network in accordance with an embodiment of the present invention.

Consider, as an example, network 10 of FIG. 10. In network 10 of FIG. 10, end hosts 88 communicate through edge switches 14E in edge portion 10E of network 10, aggregation switches 14AD in aggregation-distribution portion 10AD of network 10, and core switches 14C (one or more of which is coupled to the internet) in core portion 10C of network 10. There may be an active user associated with each of end hosts 88. Typical edge switches 14E may be connected to about 50 different end hosts 88 (as an example). Typical aggregation switches 14AD may be connected to about 20 edge switches 14E (as an example). As a result of this architecture, aggregation switches 10AD may need to handle traffic from about 1000 end hosts 88.

Active users can use web browsers and other applications that result in numerous network connections, so it is possible for aggregation switches 14AD to be required to handle 10,000 to 20,000 network connections or more. If the hardware of aggregation switches 14AD can only handle a maximum of 10,000 flow table entries, there is a potential for network 10 to become overloaded, so that some desired network connections will not be available for users.

To ensure that this potential problem is avoided, controller server 18 may provide switches in different portions of network 10 with flow table entries (matching rules) of different specificity. For example, edge switches 14E may be provided with more restrictive entries than aggregation switches 14AD, and/or aggregation switches 14AD may be provided with more restrictive entries than core switches 14C. This type of arrangement will allow a desired level of packet processing to be maintained overall, while easing the burden on switches such as aggregation switches 14AD and 14C whose capacity might otherwise be overwhelmed.

Figure 11:
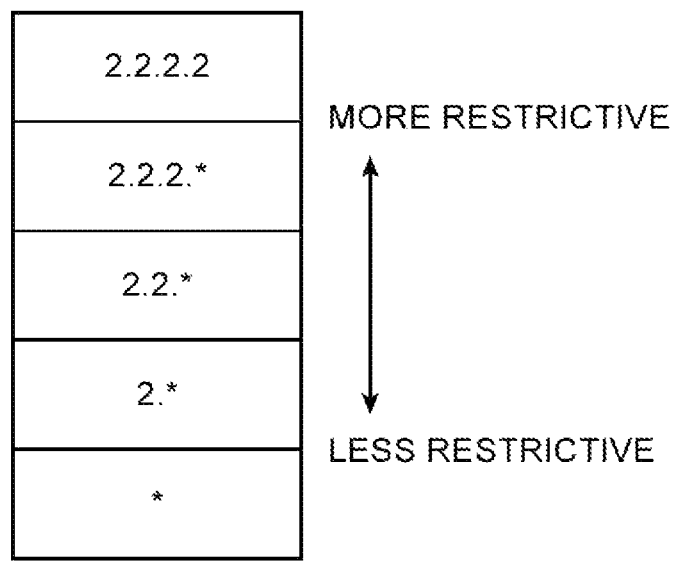
FIG. 11 is a table of illustrative flow table entries having various amounts of wildcarding in accordance with an embodiment of the present invention.

FIG. 11 shows how the matching rule associated with an illustrative header field (i.e., an IP destination address field) may be made less restrictive by incorporating more wildcarding. In the FIG. 11 example, the most restrictive value that may be used for the IP destination address field is the complete IP address "2.2.2.2". When a flow table entry has this value, the only packets that match this field will be those that contain an identical IP destination address (i.e., 2.2.2.2). A slightly less restrictive IP destination address field that may be used in the flow table entry is "2.2.2.*". By using a wildcard in the last IP address position, the requirements for matching the IP destination address field in an incoming packet are loosened, because addresses such as 2.2.2.1, 2.2.2.2, 2.2.2.3, etc. will all match the 2.2.2.* entry. The incorporation of more wildcarding will result in even less restrictive matching rules. For example, the "2.2.*" entry in FIG. 11 will match IP destination addresses of 2.2.0.0, 2.2.0.1 ..., 2.2.1.0, 2.2.1.1, .... If the flow table entry field has a value of 2.*, all IP destination addresses that start with "2." will match, regardless of their values of the last three positions in the address. If the entire field is wildcarded (i.e., if the IP destination address field of FIG. 11 has a value of "*") all incoming packets will contain an IP destination address field that is considered to match the flow table IP destination address field (i.e., "*" is considered to match every address value).

As the FIG. 11 example demonstrates, flow table values that are more heavily wildcarded correspond to less restrictive matching rules, whereas flow table values that are less heavily wildcarded correspond to more specific matching criteria. When implementing a particular functionality for packet processing in a given network, it may be desirable for at least some of the switches 14 in the network to use detailed flow table entries and correspondingly restrictive matching rules. For example, switches at or near the edge of the network may be able to handle detailed flow table entries. Nearer the core of the network, however, such detailed flow table entries will tend to overwhelm the switches because of the concentration in traffic described in connection with FIG. 10. It may therefore be beneficial to use less restrictive rules for the switches that are nearer the network core. As an example, an IP destination address field of "2.2.2.2" might be used for flow tables in edge switches 14E, whereas an IP destination address field of * might be used for flow table entries in core switches 14C. Because an entry of "*" in the core switches can be applied to numerous possible destination IP addresses, the use of the less restrictive "*" value will help minimize the number of different flow table entries that are required in core switches 14C.

Figure 12:
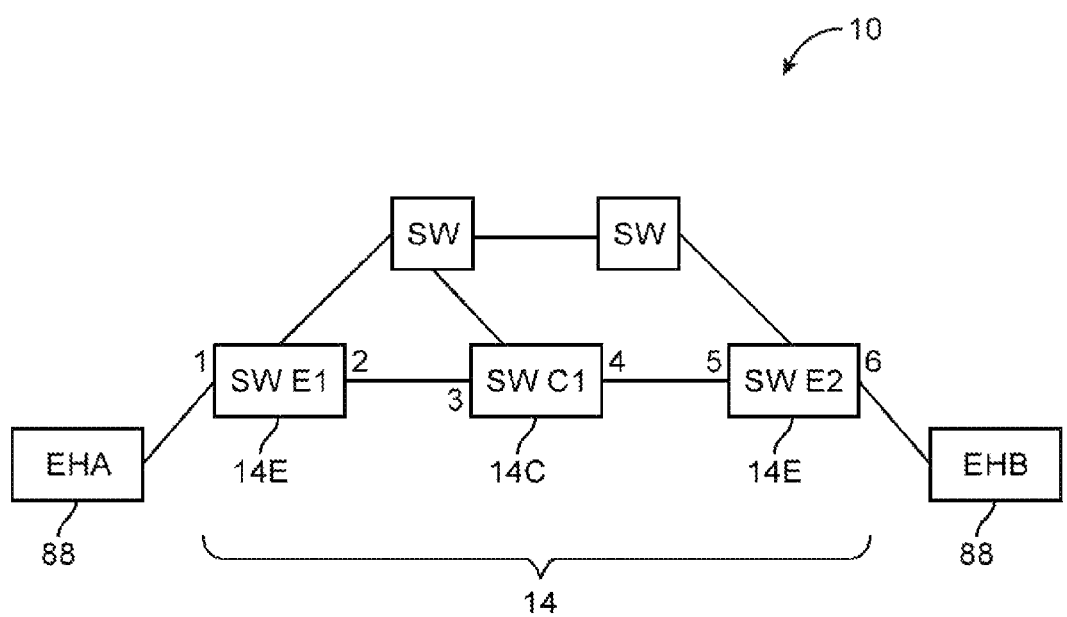
FIG. 12 is a diagram of an illustrative network showing how data may be conveyed along a path between a source packet end host and a destination packet end host in accordance with an embodiment of the present invention.

Consider, as an example, the illustrative network of FIG. 12. In the FIG. 12 example, there are two end hosts 88. End host EHA may serve as a packet source and end host EHB may serve as a packet destination. Switches 14 include edge switches 14E and core switches such as switch 14C. During setup operations or during real time network configuration operations, controller server 18 may provide switches SW E1, SW C1, and SW E2 with flow table entries suitable for forwarding packets from end host EHA to end host EHB over the network path through switch SW E1, switch SW C1, and switch SW E2. The physical input-output ports that are associated with the switches of FIG. 12 are shown adjacent to the links connecting the switches. For example, the label "1" adjacent to switch SW E1 indicates that end host EHA is connected to port 1 of switch E1. The label "2" adjacent to switch SW E1 and the label "3" adjacent to switch SW C1 indicates that port 2 of switch E1 is connected to port 3 of switch SW C1, etc.

With one conventional approach, complete matching rules are provided to the switches in the network in the form of flow table entries without wildcards. The entries specify how the switches are to forward incoming packets. FIG. 13 shows flow table entries that may be provided for the switches of the network of FIG. 12 using this type of arrangement. As shown in FIG. 13, flow table entry E1 directs switch SW E1 to forward incoming packets from port 1 to port 2. Flow table entry C1 directs switch SW C1 to forward incoming packets from port 3 to port 4 of switch SW C1. Switch SW E2 will forward incoming packets from port 5 to port 6 of switch SW E2 in accordance with flow table entry E2. The flow table entries of FIG. 13 will therefore cause packets to flow from end host EHA to EHB in network 10 of FIG. 12. This type of approach does not involve the use of wildcards in the flow table entries, which can lead to situations in which the flow table entries overwhelm the capacities of the switches. For example, switches such as switch C1 may need to be provided with flow table entries for numerous edge switches and end hosts. The number of flow table entries that would need to be stored in switch SW C1 may exceed the hardware capabilities of switch SW C1.

A conventional arrangement that addresses this problem is shown in FIG. 14. With the arrangement of FIG. 14, wildcarding is used in selected fields of the flow table entries. For example, the physical port field of each flow table entry of FIG. 14 has a wildcard. This allows packets from all of the end hosts that are coupled to a switch to be treated identically, without regard to the identity of the physical port to which each end host is attached. Because no attempt is made to process packets differently based on physical port information (and because of the other wildcarding information in the table of FIG. 14), the number of flow table entries that are needed is reduced.

While the conventional approach of FIG. 14 allows packets to be forwarded from end host EHA to end host EHB using a reduced number of flow table entries, security is compromised. In particular, the approach of FIG. 14 allows an attacker to spoof physical ports, because the switches are not able to block traffic based on physical port information.

A scheme that may be used to maintain a desired level of network performance (e.g., to maintain security) while reducing the burden that is placed on the switches of the network (e.g., the aggregation and core switches) from flow table entries is illustrated by the flow table entries of FIG. 15. Flow table entries E1', C1', and E2' may be provided to switches at different portions of the network. For example, entries E1' and E2' may be used for switches SW E1 and SW E2 of FIG. 12, respectively, and entry C1' may be used for switch 14C. Flow table entries E1', C1' and E2' may have differing levels of restrictiveness. In particular, the matching rules for switches nearer the core of the network (e.g., entry C1' for core switch SW C1 in FIG. 12) may have more wildcarding and may be less restrictive than the matching rules for switches farther from the core of the network (e.g., entries E1' and E2' for edge switches 14E).

For example, flow table entries such as entry E1', which may be used to direct switch SW E1 how to forward incoming packets, may contain specific information within the physical port input field and the IP source address field, whereas flow table entries such as entry C1', which may be used to direct an aggregation switch or core switch SW C1 how to forward incoming packets, may contain at least some wildcarding. With the example of FIG. 15, both entry E1' (used by switch SW E1) and entry E2' (used by switch SW E2) contain only complete fields and contain no fields with wildcarding, whereas entry C1' contains multiple fields that are fully wildcarded (i.e., physical input port, IP source address, destination TCP port, and source TCP port).

Because entries such as the C1' entry contain more wildcarding than entries such as the E1' and E2' entries, the use of entries such as the C1' entry helps reduce the number of flow table entries that are maintained by core switch SW C1 (in this example). This reduces the flow table burden on switch SW C1 and helps prevent switches 14 from becoming overwhelmed. At the same time, security is preserved due to the completeness of the flow table entries corresponding to the edge switches SW E1 and SW E2 (in this example). Physical port spoofing is not possible, because entries E1' and E2' retain physical port information and because core switch C1 cannot be accessed (assuming it is not possible to physically connect an end host directly to core switch C1).

Controller server 18 can distribute flow table entries for a table of the type shown in FIG. 15 selectively. For example, controller server 18 can distribute flow table entries such as flow table entry E1' to edge switches such as switch E1 but not to switches nearer the network core such as switch SW C1 and can distribute flow table entries such as flow table entry C1' to core switches or switches near the core such as switch SW C1 but not to edge switches.

FIG. 16 shows flow table entries for a scheme in which edge switch flow table entries include wildcarding. As shown by entry E1" for switch SW E1 of FIG. 12, for example, the destination TCP port field may be wildcarded and the source TCP port field may be wildcarded. As illustrated by entry E2" for switch SW E2 of FIG. 12, the IP source address field and the source TCP port may be wildcarded. The use of source TCP port wildcarding allows for a reduction in flow table entries without reducing security, because the source TCP port information in a packet is randomly assigned as part of the normal process of establishing an IP link (to ensure that return traffic is directed to an appropriate end host process) and does not generally contain useful security information. The wildcarding of the destination TCP port information in the E1" entry raises a possible security concern, because this does not allow switch SW E1 to block traffic from its associated end host EHA that is destined to an unauthorized TCP port at end host EHB. Nevertheless, because the destination TCP port field is filled with a complete (non-wildcarded) entry of 22 in flow table entry E2", switch SW E2 can perform this desired traffic blocking operation.

There is therefore no overall loss of packet forwarding functionality, even though some wildcarding is present in the flow table entries of FIG. 16. The same packet processing functions that were performed in the FIG. 15 example are performed in the FIG. 16 example, because whatever functions are lost by the wildcarding of entry E1" are made up for by the functions of the more complete fields of flow table entry E2". As with the FIG. 15 example, core switch flow table entries such as entry C1" may include wildcarding (e.g., more wildcarding than the flow table entries for switches nearer the network edge) to reduce the total number of flow table entries that must be maintained by switch SW C1.

Figure 17:
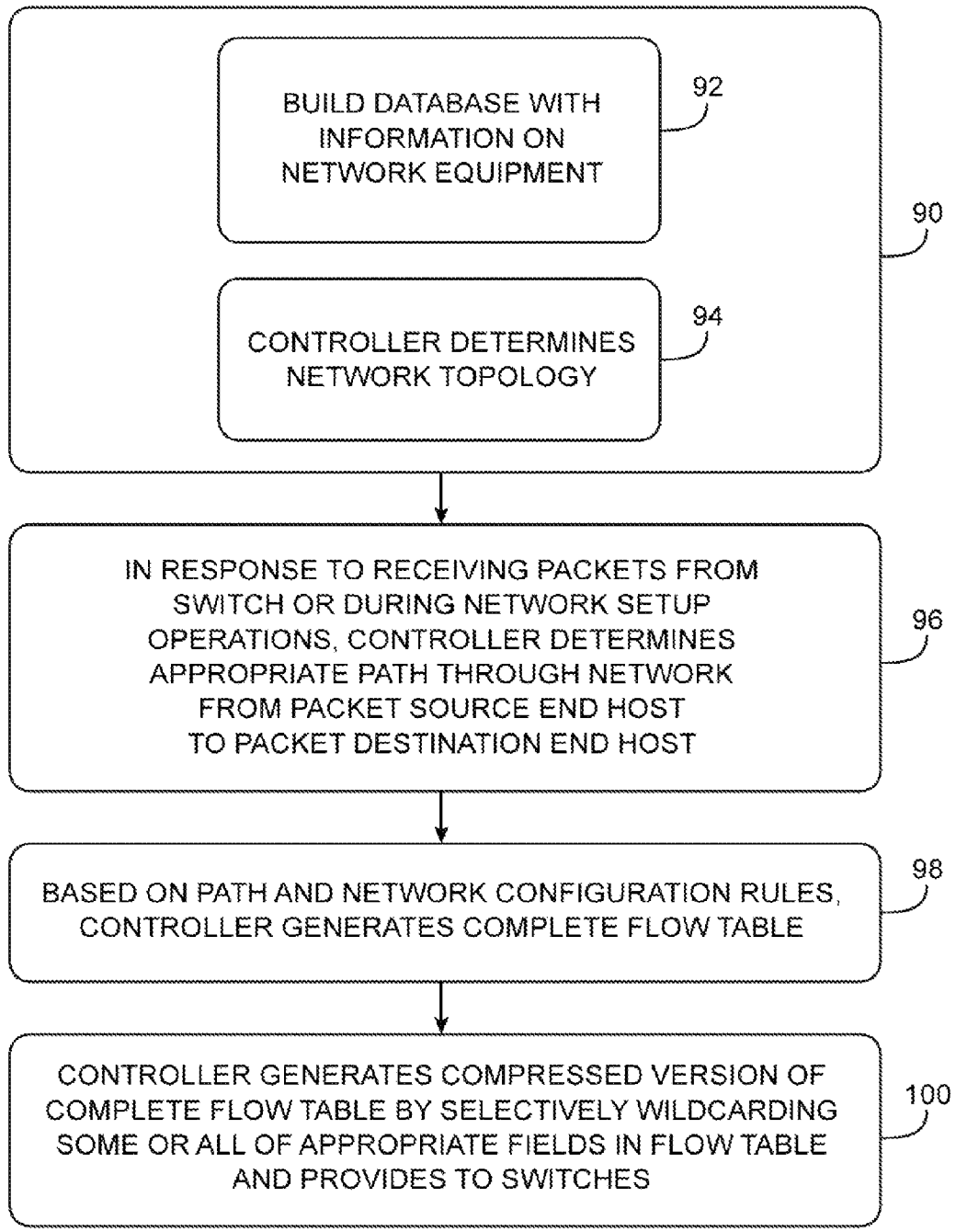
FIG. 17 is a flow chart of illustrative steps that may be used in operating a network of the type shown in FIG. 12 using flow table entries of the type shown in FIGS. 15 and 16 in accordance with an embodiment of the present invention.

FIG. 17 is a flow chart of illustrative steps involved in operating a network that includes flow table entries with different levels of specificity at different locations of the network (i.e., flow table entries that are more restrictive for switches at or near the edge of the network and that are less restrictive at or near the core of the network).

During the operations of step 90, controller server 18 may identify network equipment and may determine the topology of the network. During the operations of step 92, for example, controller server 18 may determine the capabilities of each switch 14. During the operations of step 94, controller server 18 may obtain information on the layout of the network (e.g., which switches and end hosts are connected to each of the input-output ports in a switch, etc.). Information that may be gathered on switch capabilities includes the maximum nominal flow table capacity at each switch (e.g., the nominal maximum number of flow table entries that can be handled at each switch), the actual present capacity of the switch to handle flow table entries (i.e., the number of free rows for new flow table entries that are currently present in the flow table of the switch), the types of actions that each switch can perform, etc. If desired, information may be gathered on the capabilities of end hosts in the network. Information that may be gathered on the capabilities of end hosts includes information of which types of processes are supported and what connection rules are associated with those processes (e.g., end host number X is a web server that allows any end host to connect using port 80). Network topology information may include information on which switch ports are connected to each other, how many end hosts are attached to each switch, how many other switches are connected to each switch, and the identity of the ports to which end hosts are attached. To determine the topology of the network, controller server 18 may send probe packets throughout the network such as Link Layer Discovery Protocol (LLDP) packets. Switches and other network components can return information on their capabilities when queried by the controller server. The operations of step 90 may be performed continuously during operation of network 10.

In determining the topology of the network during the operations of step 94, controller server 18 can categorize switches 14 as being associated primarily with network edge 10E, aggregation (aggregation-distribution) network portion 10AD, or network core 10C (see, e.g., FIG. 10) (e.g., categorizing switches 14 as being edge network switches or as being non-edges switches). Metrics may be applied to each switch to determine whether the switch is an edge switch (e.g., if the switch is connected to numerous end hosts) or is a non-edge switch (e.g., if the switch is not connected to any end hosts and/or is connected only to a monitoring host). Metrics may also be applied to each non-edge switch to determine whether the non-edge switch is an aggregation switch (e.g., if the switch is connected to numerous edge switches) or a core switch (e.g., switches that are connected to aggregation switches or core switches and few or no edge switches).

With one illustrative metric, a switch may be categorized as an edge switch if the switch is connected to one or more end hosts (e.g., numerous end hosts) and a switch may be categorized as a non-edge switch if the switch is connected to no end hosts and/or is connected to one host (or possibly more than one host) exclusively or primarily for monitoring purposes. With another illustrative metric that may be used by controller server 18 in categorizing switches 14, a first switch may be categorized as being more edge-like than a second switch if the first switch is connected to more end hosts than the second switch. A first non-edge switch may be considered to be more core-like (non-edge-like) than a second non-edge switch if the first switch has more attached switches than end hosts and if the second switch has fewer attached switches than end hosts. Other metrics may be used in categorizing switches if desired. These are merely illustrative examples. Once determined, switch categories may be used in distributing appropriate flow table entries during network configuration.

During the operations of step 96, controller server 18 may determine an appropriate path through network 10 for packets that are being sent from a packet source (e.g., one of end hosts 88 such as end host EHA of FIG. 12) to a packet destination (e.g., one of end hosts 88 such as end host EHB of FIG. 12). Controller server 18 may use information such as the information gathered during the operations of step 90 to determine an appropriate path for the packets. The path may be identified during network setup operations or may be determined in real time in response to receipt of packets from one of switches 14 at the controller server 18 (e.g., packets that were sent to the controller server 18 by a switch that received the packets but that did not contain a flow table entry that generated a match for the packets).

During the operations of step 98, controller server 18 may use the path that was identified during the operations of step 96 and network configuration rules 20 (FIG. 1) to generate complete flow table entries (i.e., entries of the type shown in FIG. 13). Network configuration rules 20 may contain rules on which end hosts can access which services (using aggregated end hosts if desired). These network configuration rules may be embodied in the set of flow table entries that are generated by controller server 18. For example, if certain end hosts are not allowed to access certain services, the flow table entries can be constructed so as to prevent this type of unauthorized access (e.g., by port blocking, etc.). The flow table entries that are generated at step 98 preferably include complete fields (fields with no wildcarding) and therefore maintain full packet forwarding functionality for the network.

As described in connection with FIGS. 10 and 12, the use of complete (unwildcarded) fields for all of the flow table entries in switches 14 can impose a burden on switches 14, particularly for switches that are located away from the edge of the network. To ensure that these switches are not overburdened, controller server 18 may, during the operations of step 100, generate a compressed version of the flow table entries of step 98. As described in connection with FIGS. 15 and 16, these flow table entries include wildcarding to reduce the number of flow table entries that are required. Intelligent wildcard assignments can be used to ensure that the desired packet forwarding functionality of switches 14 is preserved relative to the flow table entries produced at step 98. For example, the ability of the network switches to prevent physical port spoofing can be preserved by ensuring that the edge switches maintain physical port information (i.e., by wildcarding physical port information only for non-edge switches). As another example, the ability of the switches to implement TCP port blocking can be retained by ensuring that appropriate unwildcarded TCP port fields are retained in the edge switch entries.

In performing the operations of step 98, server controller 18 can ensure that switches are provided with flow table entries that are tailored for their position within the network. More restrictive flow table entries may be used for network switches at or near the network edge (e.g., edge switches), whereas less restrictive flow table entries may be used for switches that lie closer to the network core (e.g., non-edge switches). Flow table entries may be provided to switches based on factors such as switch location, nominal switch capacity, actual switch capacity, etc.

If core switches in the network contain flow tables and are adjustable by controller 18, the core switches can be provided with flow table entries that are as restrictive or less restrictive than the flow table entries for the aggregation switches. In some networks, the core switches may be controlled by a controller that operates independently from controller server 18 and may be incompatible with controller server 18. In this type of situation, controller server 18 need not provide the core switches with flow table entries, as the core switches can be configured using their own controller.

In a typical scenario, controller server 18 may provide edge switches 14E with complete or nearly complete flow table entries with few or no wildcarded fields. Non-edge switches such as aggregation switches 14AD may be provided with less restrictive flow table entries. For example, aggregation switches 14AD may be provided with flow table entries whose only complete field is the destination IP address field and whose other fields contain full or partial wildcards. Non-edge switches such as core switches 14C need not be provided with flow table entries from controller 18 if core switches 14C are not controlled by controller 18. If core switches 14C are controlled by controller 18, however, controller 18 may provide core switches 14C with flow table entries that are fully wildcarded with the exception of a partially wildcarded destination IP address. As an example, the flow table entries for the core switches may have wildcards in all fields except the destination IP address field. The destination IP address field in a flow table entry for the core switch might be provided with a partially wildcarded value such as "171.64.123.*" (to match packets addressed to a desired subnet) and the action corresponding to this partially wildcarded destination IP address field might be "send to port 3".

Once the flow table entries of step 100 have been generated, controller server 18 can distribute these flow table entries to appropriate switches 14. With switches 14 configured in this way, packets can flow through network 10 between packet sources and destinations.

If desired, the operations of step 98 may be combined with the operations of step 100 (i.e., the compressed flow table entries that include selective wildcarding can be generated directly from the path and network configuration rules, without performing the intermediate step of computing the complete flow table entries of step 98).

Figure 18:
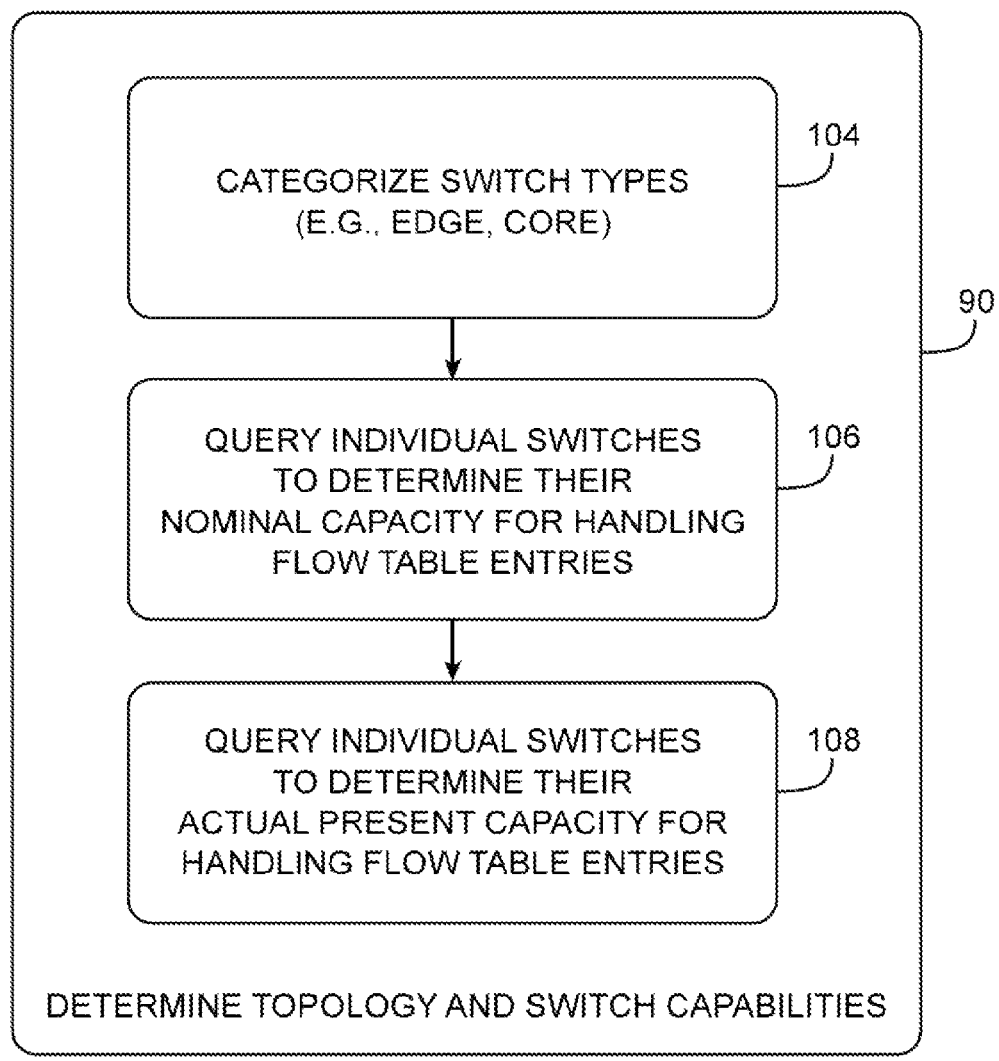
FIG. 18 is a flow chart of illustrative steps involved in determining the topology and switch capacities of switches in a network in accordance with an embodiment of the present invention.

FIG. 18 shows operations that may be involved in performing the operations of step 90 of FIG. 17 (i.e., when determining the topology of network 10 and the capabilities of its switches 14). During the operations of step 104, controller server 18 may categorize switches according to their location within network 10 using suitable metrics (e.g., metrics based on the number of attached end hosts, the number of attached switches, etc.). For example, switches that are connected to one or more end hosts 88 may be categorized as edge switches. Other switches 14 may be categorized as belonging to the network core 10C or aggregation-distribution portion of the network LOAD based on their locations within the network topology and/or factors such as the number of attached switches, etc.

During the operations of step 106 and 108, controller server 18 may issue queries to individual switches 14 in network 10 over network connections 16. For example, controller server 18 may query switches 14 on their nominal capacities during the operations of step 106. Switches 14 may respond with information on their nominal capacity (i.e., the theoretical maximum number of flow table entries that the switch could handle in the absence of any existing entries). When queried for information on their actual capacity (step 108), switches 14 can provide controller server 18 with information on their actual (present) capacity (i.e., the number of additional flow table entries that can be loaded into the switch without exceeding the switch's capabilities). The information that is gathered during the operations of step 90 may be used in producing suitable flow table entries for the switches in network 10 (e.g., in determining how to generate the flow table entries for switches 14 during the operations of steps 96, 98, and 100 of FIG. 17 so as not to overwhelm the switches with flow table entries).

Figure 19:
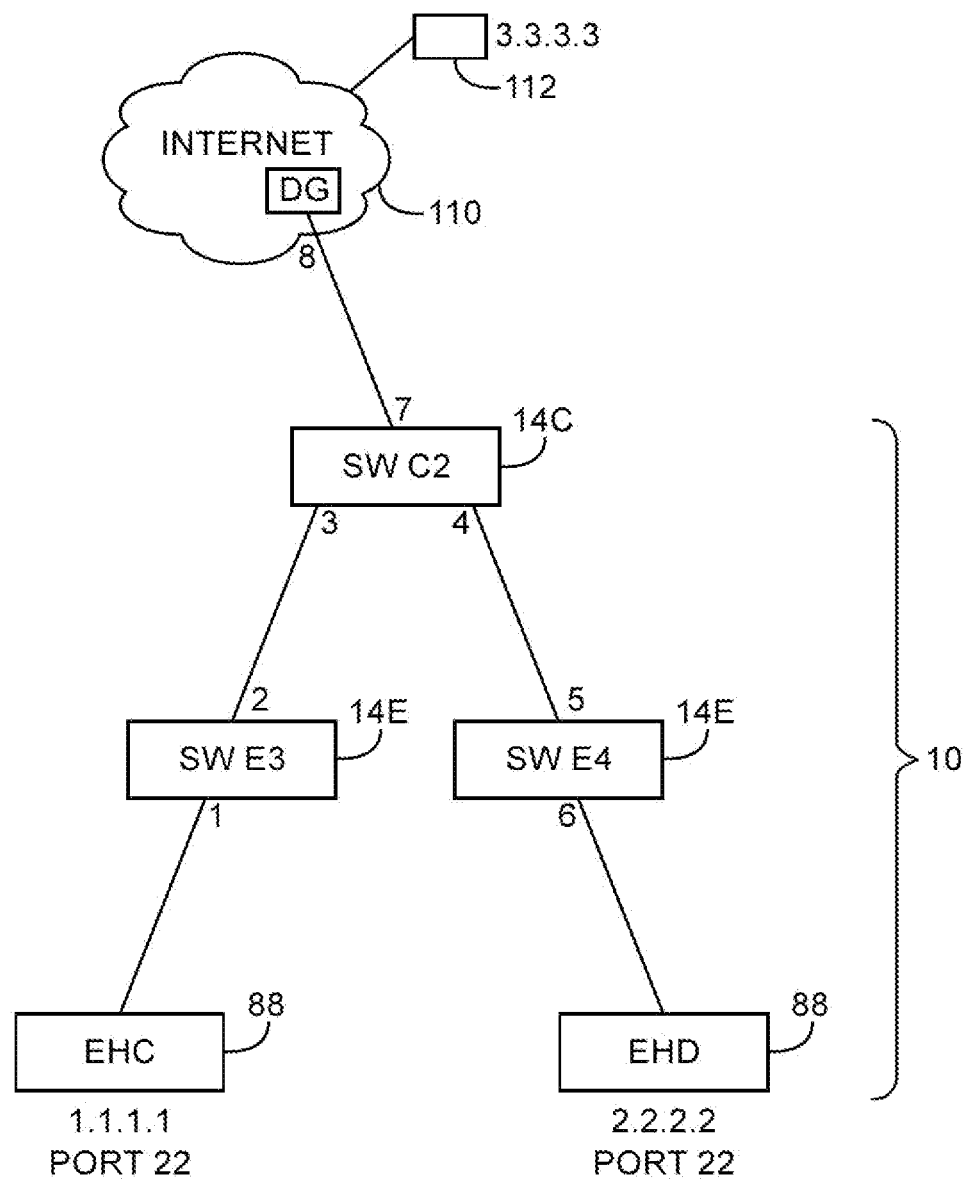
FIG. 19 is a diagram of a network that is coupled to the internet using a default gateway in accordance with an embodiment of the present invention.

In illustrative network 10 of FIG. 19, end hosts EHC and EHD are coupled to internet 110 via edge switches 14E such as switches SW E3 and SW E4 and core switches 14C such as core switch SW C2. Core switch SW C2 may be coupled to the internet by default internet gateway DG. In this example, Internet equipment such end host equipment 112 may have an associated IP address of 3.3.3.3. End host EHC may have an IP address of 1.1.1.1 and may be associated with TCP port 22. End host EHD may have an IP address of 2.2.2.2 and may be associated with TCP port 22.

In a network such as the illustrative network of FIG. 19, controller server 18 may have knowledge of the subnets which are in use in the network. Based on this information, controller server 18 may conclude that there are no end hosts in network 10 that include an IP address starting with "3" (i.e., there is no valid IP destination address of 3.* within network 10). This allows controller server 18 to construct a flow table that forwards traffic with an IP address of 3.* to default gateway DG. Other field values within the flow table entries are not needed in performing this forwarding task, because there is no 3.* destination address within network 10.

FIG. 20 is an illustrative flow table that may be used for implementing this type of packet forwarding scheme in network 10 of FIG. 19. As shown by flow table entry E3, which may be used by switch SW E3, packets from end host EHC to destination IP address 3.3.3.3 will be forwarded to port 2 of switch SW E3 (the same type of entry with 2.2.2.2 in the source address port 5 as the forwarding port may be used for packets from end host EHD). As shown by flow table entry C2, which may be used by switch SW C2, all packets whose IP destination address matches "3.*" will be forwarded to port 7 and therefore gateway DG. The other fields in flow table entry C2 may be wildcarded to minimize the number of flow table entries that are required.

Figure 21:
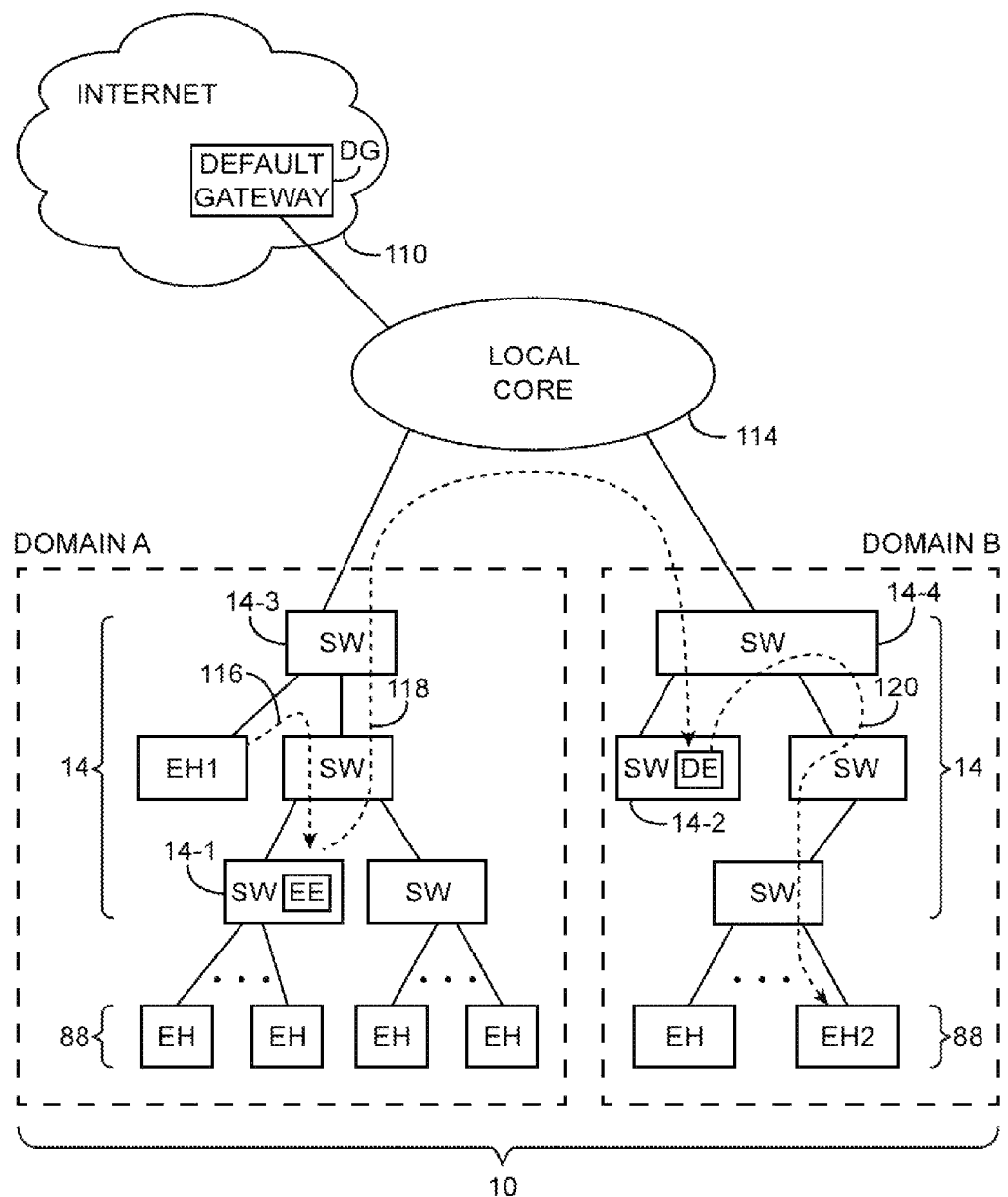
FIG. 21 is a diagram of a network containing a packet encapsulation engine and a packet deencapsulation engine that may be used in forming a tunnel through a local core network to connect isolated network domains in accordance with an embodiment of the present invention.

Another possible topology for network 10 is shown in FIG. 21. With this type of configuration, domains A and of the network are populated with switches 14 that can be loaded with flow tables from controller server 18. Because of technical limitations or due to lack of permission, the network switches in intervening local core 114 are not loaded with flow table entries from controller server 18 and may be incapable of being loaded with flow table entries from controller server 18.

To allow domains A and B to function under the control of the flow table entries supplied by controller server 18, a network tunnel (e.g., a virtual local area network tunnel) may be established through local core network 114. This tunnel may be formed by using an encapsulation engine in one domain of network 10 (e.g. domain A) to encapsulate data traffic that is destined for the other domain and in using a deencapsulation engine in the other domain of network 10 (e.g., domain B) to deencapsulate and thereby recover the encapsulated data. Encapsulation engines and deencapsulation engines in network 10 may use encapsulation methods such as Generic Routing Encapsulation (GRE), Multiprotocol Label Switching (MPLS), Virtual Local Area Network (VLAN) encapsulation techniques, other techniques for encapsulating data for a network tunnel, etc.

Due to the available hardware and software capabilities of switches 14, certain switches 14 may be more suitable for running encapsulation and deencapsulation engines. For example, switch 14-1 in domain A may be appropriate for running encapsulation engine EE and switch 14-2 in domain B may be appropriate for running deencapsulation engine DE. The switches on which encapsulation engine EE and deencapsulation engine DE are implemented need not be directly connected to local core 114. As shown in FIG. 21, for example, one or more other switches 14 (e.g., switches without encapsulation or deencapsulation engines) may be interposed between switch 14-1 and local core 114 and one or more of switches 14 (e.g., switches without encapsulation or deencapsulation engines) may be interposed between switch 14-2 and local core 114.

To ensure that traffic can tunnel through local core 114 (i.e., through the portion of the network that is not being controlled by flow table entries from the controller server), controller server 18 may generate flow table entries that forward packets within each domain of network 10 so that traffic is appropriately encapsulated and deencapsulated by engines EE and DE. For example, if traffic is being sent by end host EH1 of domain A to end host EH2 of domain B, controller server 18 may generate flow table entries that forward packets from EH1 to encapsulation engine EE on switch 14-1 through the switches along path 116, that forward packets that have been encapsulated by encapsulation engine EE along path 118 through local core 114 to deencapsulation engine DE on switch 14-2, and that forward packets that have been deencapsulated by deencapsulation engine DE to end host 88 via path 120. The path taken by the packets may pass through certain switches multiple times. For example, the packets may pass through switch 14-3 a first time when flowing along path 116 and a second time when flowing along path 118 and the packets may pass through switch 14-4 a first time when flowing along path 118 and a second time when flowing along path 120 (in this example).

Figure 22:
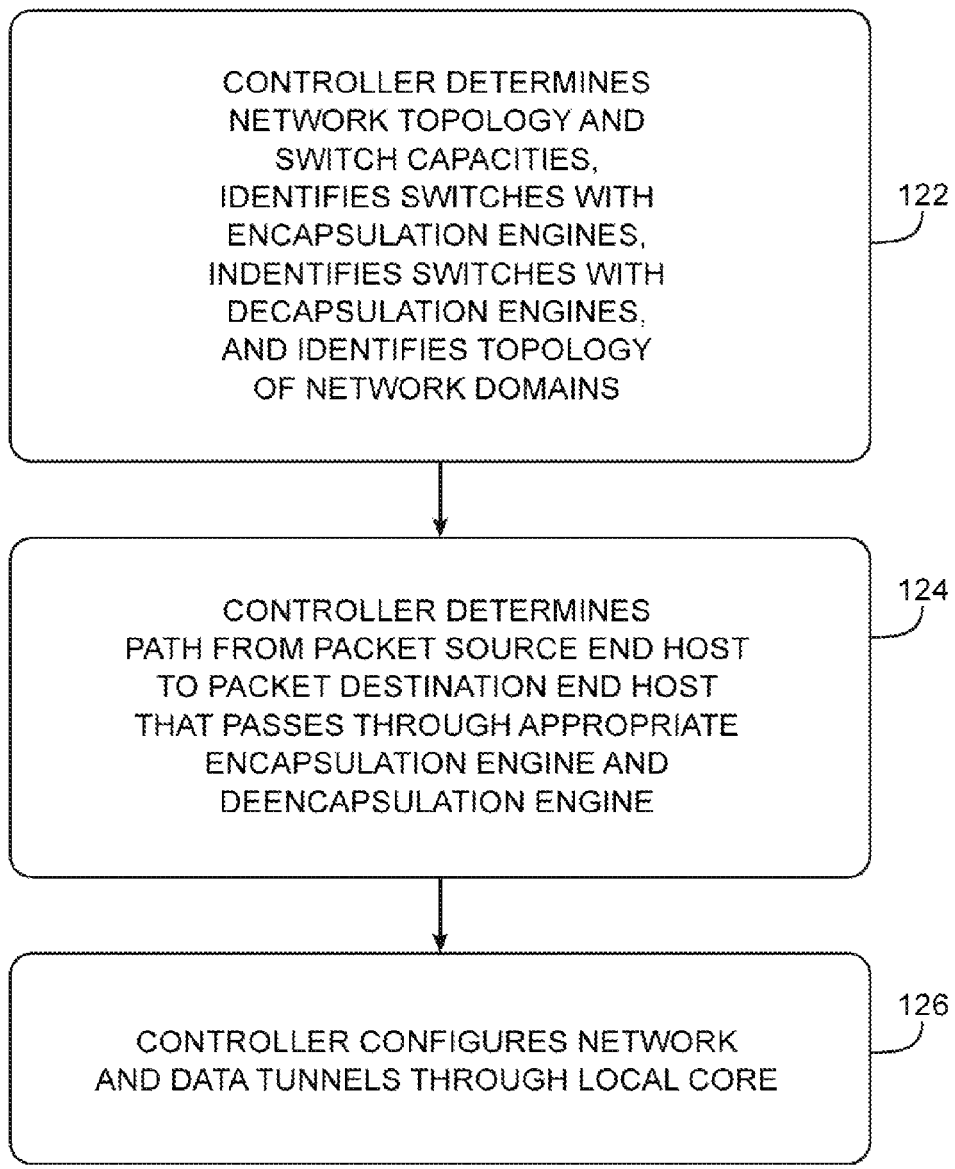
FIG. 22 is a flow chart of illustrative steps involved in operating a network of the type shown in FIG. 21 in accordance with an embodiment of the present invention.

A flow chart of illustrative steps involved in generating flow table entries for the switches of network 10 of FIG. 21 are shown in FIG. 22. During the operations of step 122, controller server 18 can gather information on the topology of network 10 (e.g., the location of the equipment of domains A and B, the interposed nature of local core 114 or other equipment that is not being controlled by the controller server 18), the flow table entry capacities and other capabilities of each switch 14 (e.g., the location of any encapsulation engines EE and deencapsulation engines for forming network tunnels through core 114), and other network information.

Based on the information gathered during the operations of step 122, controller server 18 may, at step 124, identify paths such as paths 116, 118, and 120 of FIG. 21 that direct traffic from end host EH1 to end host EH2 through encapsulation engine EE, local core 114, and deencapsulation engine DE. Controller server 18 may then configure the network accordingly at step 126 by loading switches 14 with appropriate flow table entries. During operation of network 10, traffic from end host EH1 will tunnel through the network switches of local core 114 to reach end host EH2.

Secure communications may be ensured in network 10 by using more restrictive flow table entries for edge switches than for non-edge switches. For example, edge switches may be provided with flow table entries that require that a host on a specific physical port use a specific address (e.g. an IP source address, an Ethernet source address, a VLAN tag or a combination of these with other fields such as an Ethernet address+VLAN tag). The example of FIG. 23 shows how flow table entries for edge switches may contain specific physical port information (e.g., port=4) in addition to associated address information. With this type of arrangement, flow table entries on the edge switches do not have wildcards for physical port fields and the associated address fields. The forwarding actions or other actions specified by the edge switch flow table entries will only be performed when both the physical port and the address of a packet satisfies the criteria established by the flow table entry.

Non-edge switches (e.g., aggregation switches) can be provided with less restrictive flow table entries. For example, aggregation switches can be provided with flow table entries in which physical ports are wildcarded and in which address field information alone is used to make forwarding decisions, as indicated by the illustrative non-edge switch flow table entry of FIG. 23. The aggregation switches can consider the address information in incoming packets from the edge switches to be trusted, because the edge switches contain flow table entries that prevent attacks from malicious hosts.

For example, if a malicious end host that is connected to one of the edge switches were to forge an IP source address in an attempt to impersonate another end host, the edge switch to which the malicious end host is connected would not detect a proper match for the physical port of the malicious end host. The flow table entries in the edge switch to which the malicious host is connected contain both the physical port number information and address information. Even if the address were to be successfully forged by the malicious end host, any packets from the malicious end host would contain physical port information associated with the malicious end host and not the correct physical port information of the impersonated end host. Because the physical port of the malicious end host does not match the required physical port in the edge switch flow table entries, the edge switches would not forward packets from the malicious end host to the aggregation switch and the attempted impersonation would fail.

The foregoing is merely illustrative of the principles of this invention and various modifications can be made by those skilled in the art without departing from the scope and spirit of the invention.

What is claimed is:

1. A method of using a controller server to provide network switches in a network with flow table entries, wherein each network switch processes packets by comparing packet fields to fields in the flow table entries, the method comprising:
   with the controller server, categorizing some of the network switches as being edge network switches and some of the network switches as being non-edge switches;
   with the controller server, querying the network switches to identify capacities of the network switches for handling flow table entries; and
   with the controller server, generating and distributing different flow table entries to the network switches that have been categorized as the edge network switches than the network switches that have been categorized as the non-edge switches based on the identified capacities of the network switches for handling flow table entries, wherein distributing the flow table entries comprises distributing a first portion of the flow table entries with only complete fields to the edge switches and a second portion of the flow table entries with at least some wildcarded fields to the non-edge switches without distributing the first portion of the flow table entries to the non-edge switches and without distributing the second portion of the flow table entries to the edge switches.

2. The method defined in claim 1 wherein distributing the flow table entries comprises distributing the flow table entries from the controller server to corresponding controller clients on the network switches over network connections.

3. The method defined in claim 2 wherein distributing the flow table entries comprises using a network protocol stack in the controller server to communicate over the network connections with corresponding network protocol stacks in the controller clients.

4. The method defined in claim 3 wherein each flow table entry comprises a source Internet Protocol (IP) address field, wherein the source IP address field in each of the flow table entries for the edge switches is free of wildcards, and wherein the source IP address field in each of the flow table entries for the non-edge switches contains at least some wildcarding.

5. The method defined in claim 1 wherein the network switches include ports and wherein the flow table entries include action fields that specify which of the ports the network switches should forward the packets to.

6. A method of operating a network having a first network domain associated with a first set of end hosts and network switches, a second network domain associated with a second set of end hosts and network switches, a controller server that supplies flow table entries for the network switches in the first network domain and the second network domain, and a local core network, wherein each network switch processes received packets by comparing packet fields to fields in the flow table entries, wherein an encapsulation engine is implemented on a first network switch in the first network domain, and wherein a deencapsulation engine is implemented on a second network switch in the second domain, the method comprising:
   with the controller server, generating a plurality of flow table entries for the network switches in the first domain and the network switches in the second domain that direct the network switches in the first and second domain to forward packets from a first end host in the first network domain to the encapsulation engine, to forward encapsulated packets from the encapsulation engine through the local core network to the deencapsulation engine, and to forward packets from the deencapsulation engine to a second end host in the second domain;
   with the controller server, identifying a location in the first network domain of the encapsulation engine;
   with the controller server, identifying a path from the first end host to the location of the encapsulation engine;
   with the controller server, identifying a location in the second network domain of the deencapsulation engine based on information retrieved from the switches; and
   with the controller server, identifying a path from the location of the encapsulation engine to the location of the deencapsulation engine through the local core network.

7. The method defined in claim 6 wherein the local core network is not controlled by any flow table entries from the controller server, wherein at least a given one of the network switches in the first network domain is interposed between the first network switch on which the encapsulation engine is implemented and the local core network, and wherein generating the plurality of flow table entries comprises generating a set of flow table entries that direct the network switches to forward the encapsulated packets through the given one of the network switches.

8. The method defined in claim 7 wherein the local core contains network switches that are incapable of being loaded with any flow table entries from the controller server, the method further comprising:
   providing the plurality of flow table entries from the controller server to corresponding controller clients in the network switches.

9. The method defined in claim 8 wherein providing the plurality of flow table entries comprises using network protocol stacks at the controller server and the controller clients to convey the plurality of flow table entries over network connections.

10. The method defined in claim 9 wherein using the network protocol stacks comprises using Transport Control Protocol (TCP)/Internet Protocol (IP) stacks to convey the plurality of flow table entries.

11. The method defined in claim 6 wherein the plurality of flow table entries include header fields and action fields and wherein generating the plurality of flow table entries comprises generating a set of flow table entries that direct the network switches to forward the packets twice through at least a given one of the network switches.

12. The method defined in claim 6 further comprising:
   with the encapsulation engine, producing the encapsulated packets using Multiprotocol Label Switching.

13. The method defined in claim 6 further comprising:
   with the encapsulation engine, producing the encapsulated packets using Generic Routing Encapsulation.

* * * * *